United States Patent [19]

Fehlhaber et al.

[11] Patent Number: 5,172,495

[45] Date of Patent: Dec. 22, 1992

[54] SHOE LINING

[75] Inventors: Jurgen Fehlhaber, Gorxheimertal; Ernst Pehr, Laudenbach; Dieter Groitzsch, Hirschberg/Leutershausen, all of Fed. Rep. of Germany

[73] Assignee: Firma Carl Freudenberg, Weinheim, Fed. Rep. of Germany

[21] Appl. No.: 548,078

[22] Filed: Jul. 5, 1990

[30] Foreign Application Priority Data

Dec. 9, 1989 [EP] European Pat. Off. ........ 89122731.6

[51] Int. Cl.$^5$ .............................................. A43B 23/07
[52] U.S. Cl. ....................................... 36/55; 428/198; 428/284; 428/286; 428/219
[58] Field of Search ............... 428/198, 284, 286, 219; 36/55

[56] References Cited

U.S. PATENT DOCUMENTS

| 4,521,477 | 6/1985 | Kiss | 428/284 |
| 4,612,224 | 9/1986 | Davis | 428/284 |
| 4,647,497 | 3/1987 | Weeks | 428/284 |
| 4,675,226 | 6/1987 | Ott | 428/284 |
| 4,680,219 | 7/1987 | Vernors et al. | 428/284 |
| 4,885,204 | 12/1989 | Bither et al. | 428/284 |
| 4,950,526 | 8/1990 | Singleton | 428/198 |
| 5,023,131 | 6/1991 | Kwok | 428/198 |
| 5,026,587 | 6/1991 | Austin et al. | 428/284 |

Primary Examiner—James J. Bell
Attorney, Agent, or Firm—Kenyon & Kenyon

[57] ABSTRACT

The invention refers to a lining material for shoes, comprising two to three layers of nonwoven fabric which are spot (heat) bonded together, wherein a wear resistant ply facing towards the foot (inside of the shoe) is comprised of synthetic fibers and that ply is adhered on its the side facing away from the foot to a moisture absorbent ply which contains about 30 to 70 wt. % cellulosic fibers.

13 Claims, No Drawings

SHOE LINING

FIELD OF THE INVENTION

The present invention relates to a multi-ply shoe lining having improved moisture control properties, including a spot bonded nonwoven fabric layer comprised of synthetic and cellulosic staple fibers.

BACKGROUND OF THE INVENTION

Shoe linings are used to enhance the comfort and performance of shoes, in particular, athletic, recreational and other high performance shoes where moisture control, support and wear resistance are important factors. Shoe linings consisting of spot bonded (heat) made with nonwoven fabrics staple synthetic fibers are known. The staple synthetic fibers, e.g., polyamides (nylon) or polyesters, can usually be softened thermally.

High performance shoes require wear resistant shoe linings. Therefore, durable synthetic fibers having good thermal bonding properties which produce a wear resistant nonwoven fabric surface are especially suited for making such linings. A considerable disadvantage of this type liner, however, is that synthetic fiber nonwoven fabrics cannot absorb, store or convey foot perspiration (water vapor) to the upper material of a shoe. A further disadvantage of such nonwoven fabrics is that water in the liquid state which penetrates through the upper material from outside the shoe is quickly absorbed and distributed within the entire inside of the shoe by capillarity. In either case, the shoe lining feels wet and cold after being worn for a short time.

In order to improve wearer comfort, one approach would be to admix an amount of cellulosic fibers to the synthetic fiber nonwoven fabric of a shoe lining. However, while this approach results in increased absorptive capacity for moisture; it also causes a drastic deterioration of wear resistance due to poor thermal bonding capability of cellulosic fibers.

OBJECTS AND SUMMARY OF THE INVENTION

It is an object of the present invention to increase the dryness of the known nonwoven fabric shoe linings, even when the shoes are worn for a longer period of time, while retaining the wear resistance on the foot-contacting side of the liner.

It was discovered that a shoe lining of this type can be designed to be both wear resistant as well as moisture controlling, if it is constructed in accordance with the invention.

The present invention provides a multi-ply shoe lining comprising a first ply of wear resistant fabric; and a second moisture absorbent ply of bonded nonwoven fabric comprised of synthetic staple fibers and cellulosic staple fibers Preferably, the cellulosic staple fibers are viscous or cotton fibers comprising about 30 to 70% wt. of the moisture absorbent ply; and the synthetic staple fibers are thermoplastic. Preferably, the first ply is a bonded nonwoven fabric and the synthetic staple fibers in both plies are selected from the group consisting of polypropylene, polyethylene, polyester and polyamide polymers, the polyamides (Nylons 6 and 66) being most preferred. The plies are preferably spot bonded together to form the multi-ply shoe liner.

In one advantageous embodiment, a third ply of wear resistant fabric is attached to the first and second ply so that the moisture absorbent ply is sandwiched between two wear resistant plies. Thermal spot bonding a technique well known in the art is the preferred means for attaching the plies to each other.

DETAILED DESCRIPTION OF THE INVENTION

The thermoplastic synthetic staple fibers of the wear resistant ply of nonwoven material on the foot-contacting side, which are thermally spot bonded together, provide a wear resistant surface which stands up to the demands of more highly stressed athletic and recreational shoes.

The wear resistant ply is thermally spot bonded on its reverse side (the side opposing the foot contact side) to an absorbent ply for absorbing foot perspiration comprised of nonwoven fabric which may include about 70 to 30 wt. % thermoplastic synthetic staple fibers mixed with about 30 to 70 wt. % cellulosic, viscose or natural staple fibers. This ply absorbs foot moisture which passes from the synthetic fiber nonwoven fabric (wear resistant ply) on the foot-contacting side as water vapor and thus carries this water vapor away from the foot to the upper material. This multi-ply combination provided a shoe lining having a highly wear resistant synthetic fiber ply on the foot-contacting side which feels dry even when it is worn for a longer period of time.

Two additional advantages arise from the shoe lining according to the invention. First, the multi-ply nonwoven fabric lining feels substantially softer, i.e., more textile-like, than that consisting of pure synthetic fibers alone. Second, water which penetrates through the upper material from outside the shoe spreads within the inside of the shoe only half as quickly as is the case pure synthetic fiber linings. Evidently, swelling of the cellulosic fibers in the absorbent ply due to moisture which is introduced in liquid form results in a storage effect which hinders the expected capillary routing of the water into the wear resistant ply on the foot-contacting side.

Reducing the amount of cellulosic fibers in the absorbent ply to below about 30 wt. % results in a loss of the moisture conductivity and softness so that the multi-ply liner exhibits behavior similar to a pure synthetic fiber when wet. If more than 70 wt. % cellulosic fibers are included in the absorbent ply, both the cohesiveness within the ply as well as the spot bonded attachment of these fibers with the synthetic fibers of the neighboring ply or plies is no longer reliable due to the lack of bonding (thermal) capability of cellulosic fibers.

Cotton fibers are useful in the practice of the present invention. However, the mixture of cotton and thermoplastic fibers is somewhat less well able to be heat bonded due to the twisted, flat cross section of the cotton. For this reason, then, the amount of heat bondable synthetic fibers would have to be increased within the scope of the invention.

The selection of synthetic fibers for use in this invention is not critical. It is only important that the synthetic fibers used can be spot bonded, i.e., adhere well under the influence of pressure and heat. Suitable synthetic fibers include one or several materials such as polypropylene, polyethylene, polyester or polyamide, as single or multi-component, fibers.

Both the synthetic and cellulosic staple fiber lengths used are not critical to the practice of the invention.

A three-ply design was determined to be a particularly preferred embodiment. The absorbent ply containing the cellulosic fibers can be thermally spot bonded on each side to a separate wear resistant ply. An advantage of this embodiment is that even untrained personnel can be employed to install the resulting shoe lining because mixing up the sides is insignificant.

EXAMPLE: 1

A wear resistant ply of 75 g/m², comprising polyamide 6 fibers having a titer of 1.7 dtex, is covered by a reverse-sided second (absorbent) ply of 75 g/m², which comprises of 40 wt. % polyamide 6 fibers with a titer of 1.7 dtex, and 60 wt. % viscose fibers with the same titer. This two-ply pile is thermally spot bonded together between a smooth roller and a heated spot embossing roller having a heat bonding surface area of 21%. The temperature acting on the fibers is about 212° C. The resulting nonwoven fabric two-ply liner has a thickness of about 0.4 mm.

EXAMPLE 2

A first wear resistant ply of 50 g/m² comprised of bicomponent (core/sheath) fibers including an amount of polyamide 66 and polyamide 6 fibers, having a titer of 3.3 dtex, is covered by a second absorbent ply of 50 g/m² comprising a mixture of 60 wt. % viscose and 40 wt. % bicomponent fibers as described above. The viscose fibers have a titer of 1.7 dtex. A third wear resistant fiber ply of 50 g/m², which has the same features as the first wear resistant ply is laminated onto the uncovered surface of the absorbent ply. This three-ply liner is bonded as in Example 1 by means of a heated roller having a heat bonding surface of 17%; the bonding device and the active temperature also correspond to Example 1. The resulting, spot heat bonded fiber nonwoven liner has a thickness of about 0.6 mm.

The liners from Example 1 and 2 exhibit good absorption and release of water vapor properties approximately 30% above those of the pure synthetic fiber nonwoven fabrics.

The wetting properties were measured by two tests on a pure synthetic fiber nonwoven liner and a liner of Example 2 according to the invention. The resulting values shown in Table I are a measure of the conductibility of liquid water.

TABLE I

| Wetting Properties of Shoe Linings (150 g/m²) | | | | |
|---|---|---|---|---|
| | Water level (mm) according to DIN 53 924 | | Re-Wicking-Test (s) Water level* | |
| Composition | after 1 min. | after 10 min. | 25 mm | 50 mm |
| Fibers of Polyamide 6 | 43 | 85 | 20 | 100 |

TABLE I-continued

| Wetting Properties of Shoe Linings (150 g/m²) | | | | |
|---|---|---|---|---|
| | Water level (mm) according to DIN 53 924 | | Re-Wicking-Test (s) Water level* | |
| Composition | after 1 min. | after 10 min. | 25 mm | 50 mm |
| Example 2 | 33 | 76 | 45 | 210 |

*Re-Wicking-Test: Time in seconds until a test strip which is perpendicularly dipped in water has reached a specific height.

The data in Table I demonstrates that the shoe lining according to the invention has approximately 50% less water conducting capability as compared with a liner consisting of pure synthetic fibers.

We claim:

1. A multi-ply fabric shoe liner comprising a first ply of bonded wear resistant fabric on a foot contacting side; having a second moisture absorbent ply of bonded nonwoven fabric comprised of thermoplastic synthetic fibers and cellulosic fibers adhered thereto on a side opposing the foot contacting side.

2. The multi-ply fabric according to claim 1 wherein the synthetic and cellulosic fibers are staple fibers.

3. The multi-ply fabric according to claim 2 wherein the second absorbent layer includes 30 to 70% wt. cellulosic fibers.

4. The multi-ply fabric according to claim 3 wherein the first wear resistant ply is a nonwoven fabric comprised of thermoplastic fibers.

5. The multi-ply fabric according to claim 2 wherein the cellulosic fibers are viscose fibers.

6. The multi-ply fabric according to claim 2, wherein the cellulosic fibers are cotton fibers.

7. The multi-ply fabric according to claim 4 wherein the synthetic fibers comprise single or multicomponent fibers consisting of polypropylene, polyethylene, polyester of polyamide.

8. The multi-component fabric according to claim 4 wherein another ply of wear resistant fabric is adhered directly to the moisture absorbent ply.

9. A multi-ply shoe lining comprising a wear resistant ply comprised of a nonwoven bonded fabric of staple synthetic fibers and a moisture absorbent ply comprised of nonwoven bonded fabric including staple synthetic fibers and about 60% wt. viscous staple fibers, the wear resistant ply being spot bonded to the moisture absorbent ply.

10. The multi-ply shoe lining according to claim 9 further comprising another wear resistant ply spot bonded to the moisture absorbent ply.

11. The multi-ply fabric according to claim 3 wherein the multi-ply fabric has a weight of about 150 g/m².

12. The multi-ply fabric according to claim 8 wherein the multi-ply fabric has a weight of about 150 g/m².

13. A shoe having a multi-ply shoe liner comprising a first ply of bonded wear resistant fabric on a foot contacting side; having a second moisture adsorbent ply of bonded nonwoven fabric comprised of thermoplastic synthetic fibers and cellulosic fibers adhered thereto on a side opposing the foot contacting side.

* * * * *

UNITED STATES PATENT AND TRADEMARK OFFICE
CERTIFICATE OF CORRECTION

PATENT NO. : 5,172,495

DATED : December 22, 1992

INVENTOR(S) : Fehlhaber et al.

It is certified that error appears in the above-identified patent and that said Letters Patent is hereby corrected as shown below:

Column 4      line 15, delete "fabric"

Signed and Sealed this

Tenth Day of May, 1994

Attest:

BRUCE LEHMAN

Attesting Officer      Commissioner of Patents and Trademarks